United States Patent
Kobayashi

(10) Patent No.: US 7,531,734 B2
(45) Date of Patent: May 12, 2009

(54) ELECTRONIC METRONOME AND METHOD OF INDICATING TEMPO OF ELECTRONIC METRONOME

(75) Inventor: Akiko Kobayashi, Chiba (JP)

(73) Assignee: Seiko Instruments Inc. (JP)

( * ) Notice: Subject to any disclaimer, the term of this patent is extended or adjusted under 35 U.S.C. 154(b) by 0 days.

(21) Appl. No.: 11/071,718

(22) Filed: Mar. 3, 2005

(65) Prior Publication Data
US 2005/0211073 A1 Sep. 29, 2005

(30) Foreign Application Priority Data
Mar. 15, 2004 (JP) .............................. 2004-072660

(51) Int. Cl.
G09B 15/00 (2006.01)
G09B 15/02 (2006.01)
G10H 1/00 (2006.01)
G10H 7/00 (2006.01)

(52) U.S. Cl. .......................... 84/484; 84/477 R; 84/611; 84/612

(58) Field of Classification Search .................. 84/612, 84/484, 611, 477 R
See application file for complete search history.

(56) References Cited

U.S. PATENT DOCUMENTS

| | | | |
|---|---|---|---|
| 4,014,167 A * | 3/1977 | Hasegawa et al. | 84/484 |
| 4,204,400 A * | 5/1980 | Morohoshi et al. | 84/484 |
| 4,442,752 A * | 4/1984 | Tsuchiya | 84/484 |
| 4,982,642 A * | 1/1991 | Nishikawa et al. | 84/484 |
| 5,027,686 A * | 7/1991 | Ishikawa | 84/484 |
| 5,275,082 A * | 1/1994 | Kestner-Clifton et al. | 84/477 B |
| 7,081,577 B2 * | 7/2006 | Nagakura | 84/484 |
| 7,385,128 B2 * | 6/2008 | Lawliss et al. | 84/484 |
| 2004/0255756 A1 * | 12/2004 | Nagakura | 84/484 |
| 2006/0101983 A1 * | 5/2006 | Boxer | 84/484 |

FOREIGN PATENT DOCUMENTS

| | | |
|---|---|---|
| JP | 09133779 | 5/1997 |
| JP | 2000088977 | 3/2000 |

* cited by examiner

Primary Examiner—Christina Russell
(74) Attorney, Agent, or Firm—Adams & Wilks

(57) ABSTRACT

To provide an electronic metronome making a display similar to the movement of a mechanical metronome or a parabolic movement, an electronic metronome of the present invention includes a timing setting portion for setting a timing for emitting a sound, a control portion that outputs pieces of tempo indication data and a tempo sound signal, which are based on a piece of data on a set tempo, respectively at timings based on a piece of sound emission timing information set by the timing setting portion, a display portion that is constructed of a plurality of light emitting elements or liquid crystal display segments and visually displays a tempo by sequentially displaying the pieces of tempo indication data outputted from the control portion, and a sound emitting portion that emits a sound through amplification of the tempo sound signal outputted from the control portion.

12 Claims, 3 Drawing Sheets

| INDEX | TIME [sec] | LOCATION | DISTANCE [mm] | ANGLE [DEGREE] | T_DATA |
|---|---|---|---|---|---|
| 0(NORMAL) | 0.00 | LED1 | 0.0 | 0 | 0 |
| 1 | 0.05 | LED1 | 2.0 | 5 | 10 |
| 2 | 0.10 | LED1 | 4.0 | 10 | 20 |
| 3 | 0.15 | LED2 | 6.0 | 15 | 30 |
| 4 | 0.20 | LED2 | 8.0 | 20 | 40 |
| 5 | 0.25 | LED2 | 10.0 | 25 | 50 |
| 6 | 0.30 | LED3 | 12.0 | 30 | 60 |
| 7 | 0.35 | LED3 | 14.0 | 35 | 70 |
| 8 | 0.40 | LED3 | 16.0 | 40 | 80 |
| 9 | 0.45 | LED4 | 18.0 | 45 | 90 |
| 10 | 0.50 | LED4 | 20.0 | 50 | 100 | ental view showing an example of an
ELECTRONIC METRONOME AND METHOD OF INDICATING TEMPO OF ELECTRONIC METRONOME

BACKGROUND OF THE INVENTION

1. Field of the Invention

The present invention relates to an electronic metronome and a method of indicating a tempo of an electronic metronome used in, for example, practicing playing an instrument.

2. Description of the Related Art

Conventionally, with a view to expressing a pendular movement of a pointer of a mechanical metronome, there has been widely employed a method of expressing the pendular movement by arranging a plurality of light emitting elements such as light emitting diodes or liquid crystal segments along a line and lighting them up sequentially from one end to the other (e.g., as disclosed in JP 2000-88977 A (pages 1 to 17, FIG. 2)). Further, there has also been devised and put into practice a technique of reproducing a movement similar to the pendular movement with a small number of light emitting elements by changing the illuminances of the light emitting elements in accordance with a tempo (e.g., as disclosed in JP 09-133779 A (page 1, FIG. 4)).

A conventional electronic metronome imitates the movement of a baton of a mechanical metronome display-wise, but emits a sound when either terminal one of light emitting diodes or liquid crystal segments imitating the locus of a baton is lit up. For structural reasons, however, the actual mechanical metronome emits a sound not when the baton making a pendular movement stops at either end but shortly before it reaches the other end during the pendular movement. Therefore, if someone accustomed to the baton movement and sound emission timing of the mechanical metronome uses the electronic metronome, he or she may feel a sense of discomfort in keeping up with a tempo.

SUMMARY OF THE INVENTION

It is an object of the present invention to provide an electronic metronome employing a tempo indicating method more similar to that of a mechanical metronome by making a display reproducing a movement of a baton of the mechanical metronome as a reciprocating lighting-up movement of a plurality of light emitting elements and slightly offsetting a timing for emitting a sound for the display from either terminal one of the light emitting elements or segments.

To achieve the above object, an electronic metronome of the present invention includes a timing setting portion for setting a timing for emitting a sound, a control portion that outputs pieces of tempo indication data and a tempo sound signal, which are based on a piece of data on a set tempo, respectively at timings based on a piece of sound emission timing information set by the timing setting portion, a display portion that is constructed of a plurality of light emitting elements or liquid crystal display segments arranged along a line and displays a tempo as a speed of a reciprocating movement made at a certain time interval by sequentially displaying the pieces of tempo indication data outputted from the control portion, and a sound emitting portion that emits a sound through amplification of the tempo sound signal outputted from the control portion. Because the timing for emitting a sound for the reciprocating movement displayed by the display portion can be freely set, the present invention makes it possible to indicate a tempo to a user with an expression similar to that of the mechanical metronome both visually and acoustically.

As described above, by arbitrarily setting the timing for emitting a sound for the display of a reciprocating movement of the electronic metronome, the present invention can make the movement of a pointer and the sound emission timing similar to those of the mechanical metronome and allows those accustomed to the mechanical metronome to keep time without feeling a sense of discomfort. Further, since the sound emission timing can be freely set, the present invention makes it possible to provide a new method of using metronomes, for example, to visually and acoustically keep up with a tempo as in the case of tuplets or afterbeats.

DETAILED DESCRIPTION OF THE PREFERRED EMBODIMENT

An embodiment of the present invention will be described hereinafter with reference to the drawings.

Figure 1:
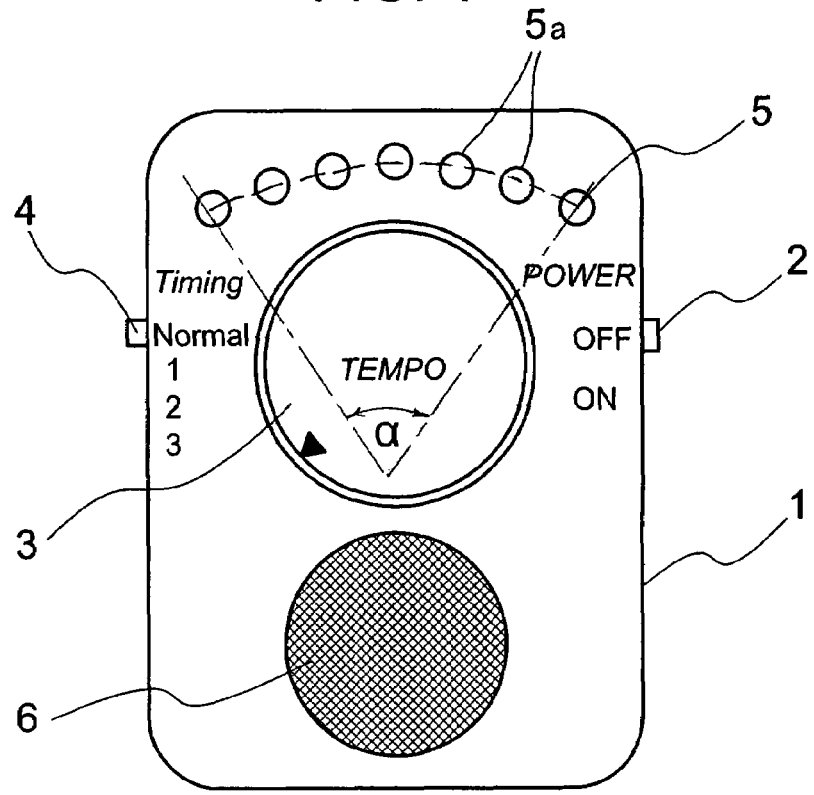
FIG. 1 is an external view showing an example of an embodiment of an electronic metronome employing the present invention.

FIG. 1 is a front view of an electronic metronome according to an example of the embodiment of the present invention. A power source switch 2, a tempo switch 3, a timing switch 4, a tempo displaying portion 5, and a speaker 6 are disposed in a body case 1. If the power source switch 2 is operated to turn the metronome on and a desired tempo is set using the tempo switch 3, the tempo displaying portion 5 displays a tempo as a reciprocating movement by, for example, being lit up or turned on on the basis of a set value. The speaker 6 emits an audible sound in accordance with the tempo. In this manner, the metronome performs its function. The timing switch 4 sets a sound emission timing for the reciprocating movement of the tempo displaying portion 5. The speaker 6 usually emits a sound based on a tempo set at both ends of the reciprocating movement of the metronome. However, by operating the timing switch 4, the speaker 6 may also be set such that a sound is emitted at a location other than either end of the reciprocating movement.

Figure 2:
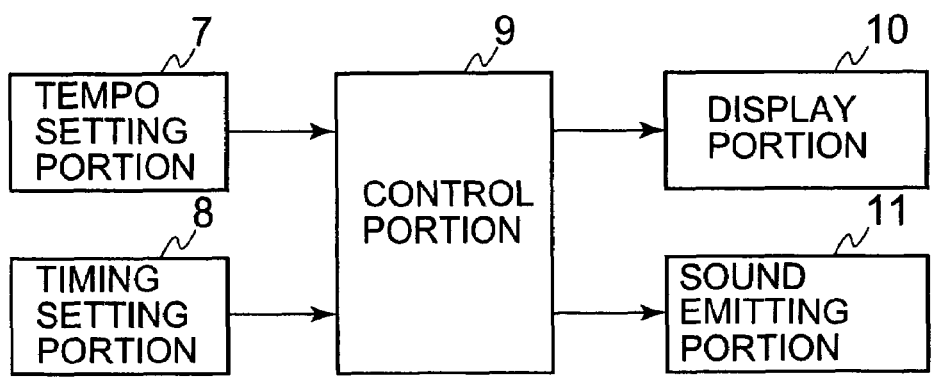
FIG. 2 is a block diagram showing the example of the embodiment of the electronic metronome employing the present invention.
Figures 3, 4:
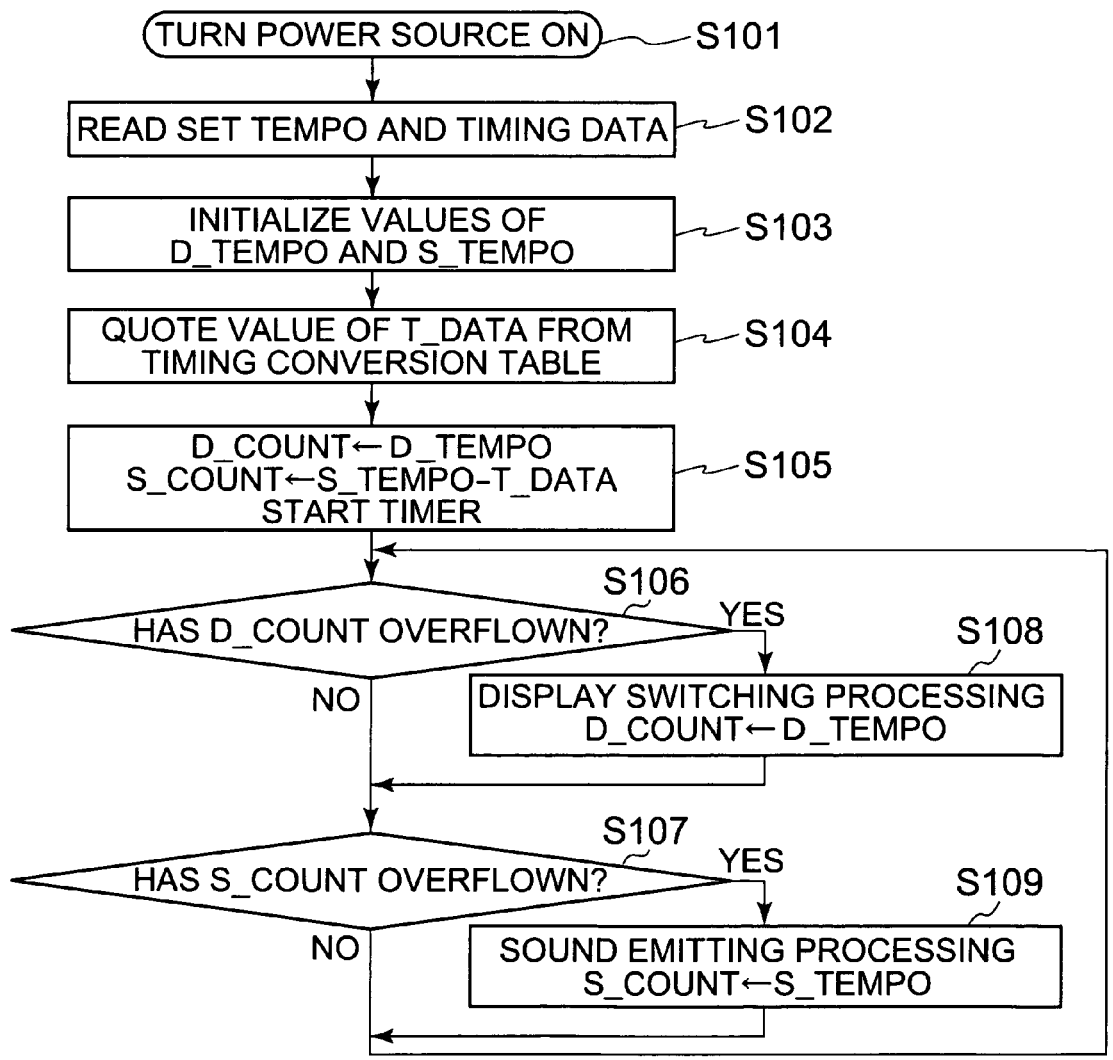
FIG. 3 is a view showing a sound emission timing conversion table.
FIG. 4 is a flowchart for showing a main routine.

FIG. 2 shows a structural example of an electric circuit of the present invention. This electric circuit is mainly composed of a tempo setting portion 7 for setting a tempo desired by a user, a timing setting portion 8 for setting a sound emission timing, a control portion 9 that carries out a processing for causing the metronome to perform its function based on the set values, a display portion 10 that is structured as display elements 5*a*, such as light emitting elements, liquid crystal segments or the like, disposed in a row or line and intended to be turned on to make a visual display as set in response to a command from the control portion 9, and a sound emitting portion 11 that emit an audible sound at a set timing and at a set tempo. FIG. 3 is a view showing a table for converting set items of sound emission timings into time. The timing switch 4 can set the unit representing a deviation from the timing of the reciprocating movement as time, location, distance, or the like. Further, as shown in FIG. 1, if the display portion 10 is structured by arranging a plurality of display elements 5a, such as light emitting elements or liquid crystal display segments, along a circular arc that subtends a prescribed angle α, the unit can also be set as an angle within the prescribed angle α from one end to the other end of this circular arc. In other words, the setting can be made as a time difference from a usual sound emission timing as a reference timing, or in such a manner as to emit a sound when a plurality of light emitting elements or liquid crystal segments constituting the display elements 5a of the tempo displaying portion 5 are lit up (turned on), or as a distance or angle from either end of the light emitting elements or liquid crystal segments. Pieces of information on these units, namely, time, location, distance, angle, and the like are transmitted from the timing setting portion 8 to the control portion 9. Because all of these pieces of data first need to be converted into a timer count value $T_{13}$ DATA for emitting sounds according to the tempo, the control portion 9 calculates the value T_DATA by referring to the sound emission timing conversion table shown in FIG. 3. A sound emitting operation is then started to activate the speaker 6 at a timing earlier than the display data transmitted to the display portion 10 by a time set as the value $T_{13}$ DATA. Thus, the reciprocating movement in the tempo displaying portion 5 and the tempo sound emitted from the speaker 6 are always offset from each other by a certain time interval. Consequently, the tempo can be recognized at respective timings specific to visual and auditory senses.

Figure 5:
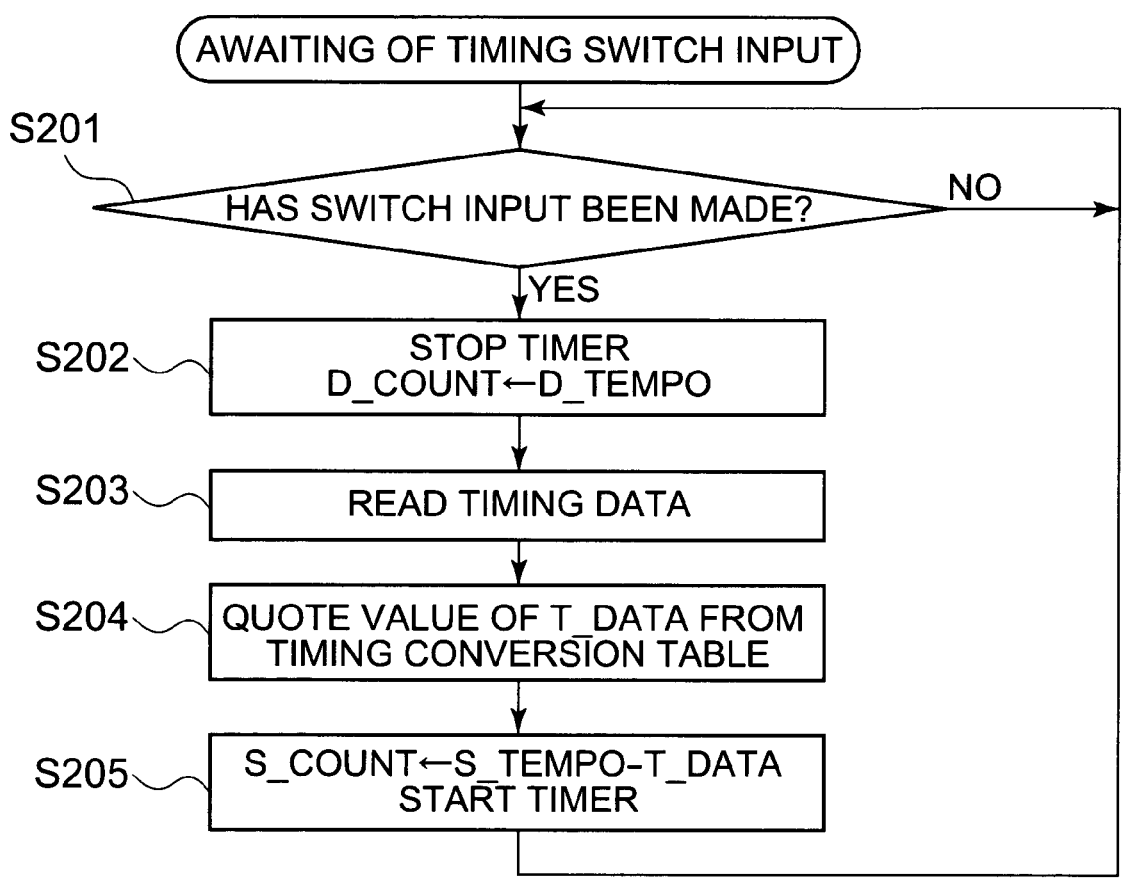
FIG. 5 is a flowchart for showing a switch input routine.

FIG. 4 is a flowchart relating to a main routine of the electronic metronome based on the embodiment of the present invention. FIG. 5 is a flowchart of a timing switch input routine for implementing the present invention. These processings are performed by the control portion 9.

First of all, when the power source is turned on (S101), states of the tempo switch 3 and the timing switch 4 are read. Based on these states, values of a set tempo and timing data are acquired respectively (S102). Count values for controlling the switching of a display and the emission of a sound according to the tempo by means of a timer are then set from the value of the set tempo and defined as D_TEMPO and S_TEMPO respectively (S103). Further, a value of T_DATA is acquired by referring to the sound emission timing conversion table of FIG. 3 from the timing data (S104). Then, the obtained count value D_TEMPO and a value obtained by subtracting T_DATA from S_TEMPO are assigned to a counter D_COUNT for controlling the display and a counter S_COUNT for controlling the timing for emitting the sound, respectively. Then, when the timer is started, relevant pieces of data are transmitted to the display portion 10 and the sound emitting portion 11, respectively, and as a result, the metronome performs its function (S105). If the value of D_COUNT has overflowed while the metronome is in operation (S106), a new piece of display data is transmitted to the display portion 10, and D_TEMPO is assigned to D_COUNT again (S108). Similarly, if S_COUNT has overflowed (S107), a sound-emitting signal is transmitted to the sound emitting portion 11, and the value of S_TEMPO is assigned to S_COUNT this time (S109) Thus, a delay of T_DATA is created only when the metronome is started, and the sound can be emitted at the calculated sound emission timing.

Next, the operation of the metronome in the case where the operation of the timing switch 4 has caused a change in the timing data will be described with reference to a flowchart of FIG. 5. When a change in the state of switch input is received from the timing switch 4 (S201), the timer is first stopped temporarily and the operation of the metronome is stopped. Then, D_TEMPO is assigned to D_COUNT to reset the counter for display control (S202). Subsequently, the post-change timing data transmitted from the tempo setting portion 7 are read (S203), and a new counter value T_DATA is acquired from the sound emission timing conversion table of FIG. 3 on the basis of the data (S204). A value obtained by subtracting the just-acquired value of T_DATA from S_TEMPO is then assigned to S_COUNT, whereby the timer is restarted (S205). Thus, while the change in the timing data is taken into account, the metronome restarts to perform its function of displaying a tempo by the tempo displaying portion 5 and emitting a sound from the speaker 6.

Thus, a tempo can also be indicated such that the reciprocating movement in the tempo displaying portion 5 and the metronomic sound emitted from the speaker 6 are slightly offset from each other, for example, by setting the sound emission timing identical to that of a mechanical metronome.

What is claimed is:

1. An electronic metronome comprising:
a tempo setting portion for setting a tempo;
a timing setting portion for arbitrarily setting an offset timing for emitting a sound;
a control portion that outputs pieces of tempo indication data and a tempo sound signal, which are based on the set tempo, at timings acquired from a sound emission timing conversion table;
a display portion that has a plurality of light emitting elements or liquid crystal display segments disposed along a line and that displays the set tempo as a speed of a reciprocating movement made at a certain time interval by sequentially displaying the pieces of tempo indication data outputted from the control portion; and
a sound emitting portion that emits a tempo sound through amplification of the tempo sound signal outputted from the control portion;
wherein the offset timing set by the timing setting portion is offset from a reference timing for lighting up a terminal one of the plurality of light emitting elements or liquid crystal display segments that are disposed along the line to constitute the display portion so that the timing of emitting the tempo sound is offset from the timing of lighting the terminal light emitting element or liquid crystal display segment.

2. An electronic metronome according to claim 1; wherein the offset timing set by the timing setting portion is set as a time difference from a reference timing for lighting up the terminal one of the plurality of light emitting elements or liquid crystal display segments.

3. An electronic metronome according to claim 1; wherein the offset timing set by the timing setting portion is set as a position of one of the plurality of light emitting elements or liquid crystal display segments.

4. An electronic metronome according to claim 1; wherein the offset timing set by the timing setting portion is set as a distance from the terminal one of the plurality of light emitting elements or liquid crystal display segments.

5. An electronic metronome, comprising: a tempo setting portion that enables a user to set a desired tempo; a timing setting portion that enables the user to selectively input sound emission timing information to set a sound emission timing for emitting a tempo sound; a display portion having a plurality of display elements that are disposed in a row and that are sequentially turned on, from one end of the row to the other end of the row, in a reciprocating manner to visually indicate the set tempo; a sound emitting portion that emits an audible tempo sound; and a control portion that controls the sequential turning on of the display elements to visually indicate the set tempo and that controls the timing at which the audible tempo sound is emitted based on a sound emission timing conversion table so that the audible tempo sound is emitted at the set sound emission timing which is earlier than a timing at which an end one of the row of display elements is turned on.

6. A electronic metronome according to claim 5; wherein the sound emission timing information set by the timing setting portion is set as a time difference from a reference timing for turning on an end one of the row of display elements.

7. A electronic metronome according to claim 5; wherein the sound emission timing information set by the timing setting portion is set as a position of one of the display elements in the row of display elements.

8. A electronic metronome according to claim 5; wherein the sound emission timing information set by the timing setting portion is set as a distance from an end one of the display elements.

9. A electronic metronome according to claim 5; wherein the display elements are liquid crystal display segments.

10. A electronic metronome according to claim 5; wherein the display elements are light emitting elements.

11. A method of operating an electronic metronome that has a speaker and a row of display elements, comprising the steps:

sequentially turning on the display elements, from one end of the row to the other end of the row, in a reciprocating manner to visually indicate a given tempo; and activating the speaker to emit an audible tempo sound at the given tempo and at a timing that is acquired from a sound emission timing conversion table based on timing information selected by a user and that is offset from the timing at which an end one of the row of display elements is turned on.

12. A method according to claim 11; wherein the activating step comprises activating the speaker to emit an audible tempo sound at the given tempo and at timings that are offset from the timings at which opposite end ones of the row of display elements are turned on.

* * * * *